Patented June 7, 1966

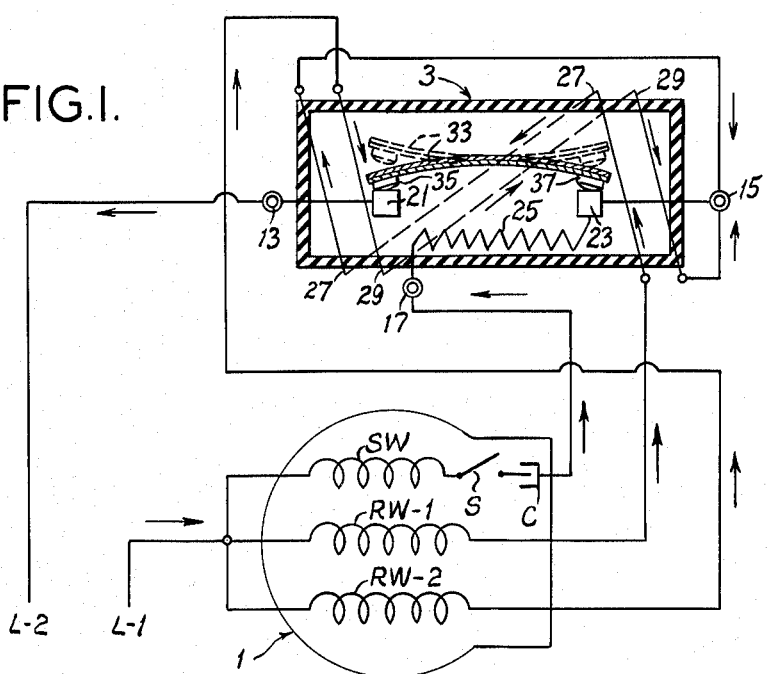
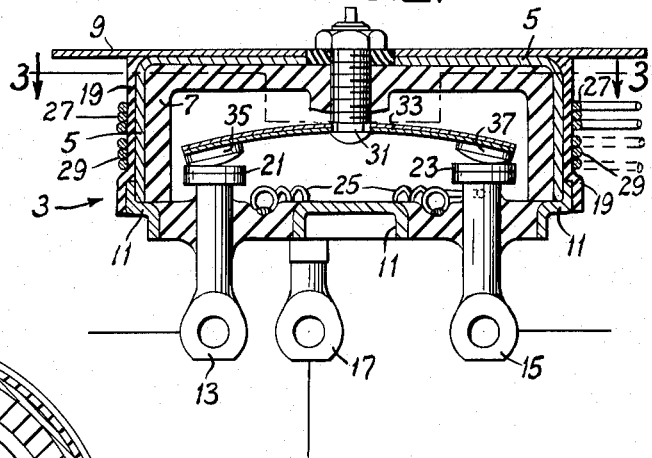
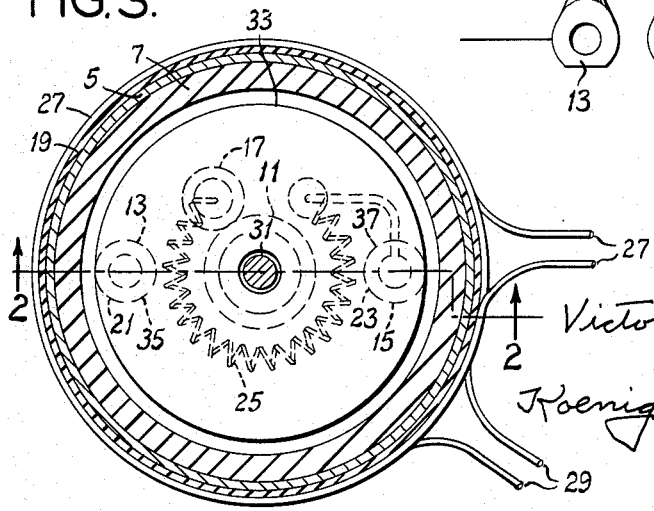

3,255,397
MOTOR PROTECTION
Victor G. Vaughan, Corpus Christi, Tex., assignor to Texas Instruments Incorporated, Dallas, Tex., a corporation of Delaware
Filed Oct. 29, 1962, Ser. No. 233,511
6 Claims. (Cl. 318—221)

This invention relates to motor protection, and with regard to certain more specific features, to protection of electric motors having three or more windings, such as, for example, single-phase A.C. motors having a start winding and at least two main windings.

Among the several objects of the invention may be noted the provision of protective means relating to motors of the class described in which the windings, and more particularly the main windings, are individually more effectively protected by use of individual heaters for the windings adapted to improve responsive action by a thermostatic protective switch; the provision of means of the class described in which the thermostatic switch and heater elements therefor are arranged for magnetic field neutralization or degaussing action designed to minimize the effect of any magnetic fields asociated with the heaters such as might adversely affect the arc rupturing ability of protector switch contacts; and the provision of means of this class adapted for an improved and compact arrangement of its protective switch and heater components. Other objects and features will be in part apparent and in part pointed out hereinafter.

The invention accordingly comprises the elements and combinations of elements, features of construction, and arrangements of parts which will be exemplified in the constructions and products hereinafter described, and the scope of which will be indicated in the following claims.

In the accompanying drawings, in which one of various possible embodiments of the invention is illustrated, FIG. 1 is a circuit diagram illustrating the invention;

FIG. 2 is a cross section of a typical protective unit made according to the invention, being taken on line 2—2 of FIG. 3; and FIG. 3 is a cross section taken on line 3—3 of FIG. 2.

Corresponding reference characters indicate corresponding parts throughout the several views of the drawings.

For purposes of illustration the invention will be described in relation to a single-phase A.C. motor having a capacitor start winding and two main or run windings; but it will be understood that it has application to similar motors having other numbers of main windings. Protective circuits have heretofore been provided for motors in which heaters have been employed to accelerate protective action by a thermostatic switch. Such circuits have not been completely successfully employed because of erratic switch action brought about by stray magnetic fields, particularly when any main winding heaters were wound around the casing containing the thermostatic switch. The present invention avoids these difficulties.

Referring to the drawings, numeral 1 designates a typical single-phase, capacitor-start A.C. motor having connections for 110 v. operation when connected across opposite sides L–1 and L–2 of a power line. The motor includes a start winding SW and two main or run windings RW–1 and RW–2, all of which are shown as being connected in parallel, although certain modifications in this regard come within the scope of the invention. At C is shown its start-winding capacitor and at S its starting switch which actuates in response to a certain value of speed attained to deenergize the start winding. At numeral 3 is shown a thermostatic switch which includes a metal casing or housing 5 in which is an insulating liner 7. The casing may be mounted upon a suitable bracket 9 in appropriate relationship, such as a heat-exchange relationship with the motor being served. On the casing 5 is a cover 11. Insulated line terminals 13, 15 and 17 are supported by the cover 11. An outside jacket of insulation 19 surrounds the switch 3. The terminals 13 and 15 carry inside line contacts 21 and 23, respectively. The electrical insulator materials forming parts 7 and 19 are both heat-conductive.

Located within the housing is an internal toroidally coiled, run-winding heater 25, conductively connected to the terminal 15 and hence to contact 23. The heater is in close heat-exchange relationship with a thermostatic snap-acting disc 33. The other end of this heater is connected to the terminal 17. Wrapped around the outside insulation 19 of switch 3 are heater-forming wires 27 and 29. These are shown diagrammatically in FIG. 1, but it will be understood that, as shown in FIGS. 2 and 3, each may consist of a number of loops of resistance wire around the switch 3. This location for wires 27 and 29 is advantageous when there is insufficient space within the housing to accommodate them or when for some reason it is desired to subject them to a convective cooling current, for example as set forth in U.S. Patent 3,023,350.

The disc 33 is mounted on an adjustable post 31 within the casing 5 of switch 3. It carries contacts 35 and 37, engageable and disengageable with the inside line contacts 21 and 23, respectively. The normal position of the disc 33 when cool, as under safe running conditions of the motor 1, is as shown in FIG. 2, wherein contacts 35 and 37 engage contacts 21 and 23 respectively. When the disc temperature is raised by heating, as under excessive current caused by unsafe motor conditions, it snaps to an alternate open position shown by dotted lines in FIG. 1. Heating occurs primarily by resistance heating when excessive current flows through the disc 33 but snap action is accelerated by heat also received from the internal heater 25. Some heating effect may also be gained by having the switch 3 in heat-exchange relationship with the motor. The disc 33 also receives heat from one or both of the externally wound heaters 27 and 29 for disc operation when these heaters are hot enough for the purpose.

Connections are as follows:

The motor windings SW, RW–1 and RW–2 are for example in parallel connection with side L–1 of the line. Start winding SW is connected through the switch S, capacitor C, terminal 17, start-winding heater 25, contacts 23, 37, disc 33, contacts 35, 21 and terminal 13 to the other side L–2 of the line. Thus heater 25 is separately connected with the start winding SW.

Heater 27 is connected to the main winding RW–1. It is also connected to the other side L–2 of the line through terminal 15, contacts 23, 37, disc 33, contacts 35, 21 and terminal 13. Heater 29 is connected to the other main winding RW–2. It is also connected to the other side of the line through terminal 15, contacts 23, 37, disc 33, contacts 35, 21 and terminal 13.

Referring to FIG. 1, the heaters 27 and 29 are both coiled around the casing switch 3. Therefore each acts as a solenoid wherein the switch parts within casing 5 are within its magnetic core. Electric currents passing through these parts also pass through this core, and if special precautions are not taken, will be erratically deflected, particularly where arcing occurs at the opening and closing points of the contacts 21, 35 and 23, 37. To prevent this the core volume occupied by the casing 5 in the heater coils 27 and 29 is degaussed. This is done by coiling the heaters 27 and 29 in such a manner as to carry currents in opposite directions. Preferably each has a number of effective ampere turns under switch-opening conditions which are equal to, or approximately equal to, those of the other. Thus their electromagnetic fields, due to their coiled natures, buck and offset one another either completely or substantially enough that any residual magnetic field will not adversely affect the arc-rupturing capacity of the contacts 21, 35 and 23, 37. This is sometimes referred to as a degaussing effect.

A feature of the invention is that each winding, and more particularly each main winding, has individually connected to it an individually responsive heater, and that the coils of the main-winding heaters are wound in electromagnetic opposition so that their magnetic fields tend to neutralize each other in the space occupied by the thermostatic switch within the housing 5. In other words, the opposing fields tend substantially to degauss the contained switch parts. A subsidiary feature is that individual allocations of heaters to windings are conveniently obtained by the series connections between windings and their respective heaters; and also the parallel connections between these series-connected windings and heaters.

It will be understood that the motor protective system of this invention is applicable to multispeed, dual voltage or other electrical energy translating devices having two or more windings.

In view of the above, it will be seen that the several objects of the invention are achieved and other advantageous results attained.

As various changes could be made in the above constructions and products without departing from the scope of the invention, it is intended that all matters contained in the above description or shown in the accompanying drawings shall be interpreted as illustrative and not in a limiting sense.

What is claimed is:

1. A motor protector circuit for a motor having a plurality of main windings, comprising heaters connected to at least two of said main windings respectively, a thermostatic switch, a housing for said switch, each of said heaters comprising a resistance element coiled around said housing and so connected between its respective main winding and the thermostatic switch that the currents flowing through said connected heaters establish magnetic fields tending to neutralize each other in the space occupied by said switch within the housing.

2. A motor protector circuit for a motor having a plurality of windings comprising:
   a thermostatic switch including terminals;
   a first resistance heater element connected at one end thereof in series with one of said motor windings, said first resistance element being coiled around the switch in heat-exchange relation thereto and connected at its other end with one of the terminals of said switch; and
   a second resistance heater element connected at one end thereof in series with another of said motor windings, said second resistance element being coiled around the switch and also being connected at its other end to said one of the switch terminals, said resistance elements being coiled to carry current in opposite directions around the switch whereby the magnetic fields produced by the currents through said resistance elements tend to neutralize each other in the space occupied by the switch.

3. A motor protector circuit according to claim 2 in which the motor includes a start winding and said circuit further comprises a resistance heater in heat-exchange relation to the switch and connected in series with said start winding.

4. A motor protector circuit according to claim 3 further comprising a start switch for disconnecting said start winding when running speed is achieved.

5. A motor protector circuit for a single-phase motor having a plurality of windings each of which is connected at one end to one side of a power line, said circuit comprising:
   a thermostatic single-pole switch having a pair of terminals, one terminal being connected to the other side of the power line;
   a first resistance heater element connected at one end thereof in series with one of said motor windings, said first resistance element being coiled around the switch in heat-exchange relation thereto and connected at its other end with the other terminal of said switch; and
   a second resistance heater element connected at one end thereof in series with another of said motor windings, said second resistance element being coiled around the switch and also being connected at its other end to said other one of the switch terminals, said resistance elements being coiled to carry current in opposite directions around said switch whereby the magnetic fields produced by the currents through said resistance elements establish magnetic fields which tend to neutralize each other in the space occupied by said switch.

6. A motor protector circuit according to claim 5 in which the ampere turns of each of said coiled resistance elements are substantially the same under switch-opening conditions.

References Cited by the Examiner
UNITED STATES PATENTS

| | | | |
|---|---|---|---|
| 2,744,226 | 5/1956 | Seely | 318—221 |
| 2,768,342 | 10/1956 | Vaughan | 318—221 |
| 3,023,350 | 2/1962 | Broadley | 318—221 |

MILTON O. HIRSHFIELD, *Primary Examiner.*

ORIS L. RADER, G. FRIEDBERG, C. E. ROHRER,
*Assistant Examiners.*